US009285023B2

United States Patent
Ishikawa et al.

(10) Patent No.: US 9,285,023 B2
(45) Date of Patent: Mar. 15, 2016

(54) HYDRAULIC DRIVE OF OPERATING MACHINE

(75) Inventors: Kouji Ishikawa, Tsuchiura (JP); Hidetoshi Satake, Tsuchiura (JP); Shinji Nishikawa, Tsuchiura (JP); Takatoshi Ooki, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 340 days.

(21) Appl. No.: 14/009,127

(22) PCT Filed: Mar. 28, 2012

(86) PCT No.: PCT/JP2012/058155
§ 371 (c)(1),
(2), (4) Date: Oct. 1, 2013

(87) PCT Pub. No.: WO2012/137647
PCT Pub. Date: Oct. 11, 2012

(65) Prior Publication Data
US 2014/0323268 A1    Oct. 30, 2014

(30) Foreign Application Priority Data
Apr. 1, 2011    (JP) .................... 2011-081734

(51) Int. Cl.
*E02F 9/22*    (2006.01)
*F16H 39/00*    (2006.01)
*E02F 9/12*    (2006.01)

(52) U.S. Cl.
CPC ............... *F16H 39/00* (2013.01); *E02F 9/128* (2013.01); *E02F 9/226* (2013.01); *E02F 9/2282* (2013.01); *E02F 9/2285* (2013.01); *E02F 9/2296* (2013.01); *Y10T 477/631* (2015.01)

(58) Field of Classification Search
CPC ...... F15B 11/08; E02F 9/2292; E02F 9/2296; E02F 9/128
USPC .......................................................... 60/435
See application file for complete search history.

(56) References Cited

U.S. PATENT DOCUMENTS 5,940,997 A * 8/1999 Toyooka ............... E02F 9/2296
                                                               37/411
2013/0060432 A1 * 3/2013 Take ......................... E02F 9/128
                                                               701/50

FOREIGN PATENT DOCUMENTS

CN     201198850 Y     2/2009
JP     63-312432 A     12/1988
(Continued)

OTHER PUBLICATIONS

Corresponding International Search Report with English Translation dated Jul. 3, 2012 (four (4) pages).
(Continued)

*Primary Examiner* — Thomas E Lazo
(74) *Attorney, Agent, or Firm* — Crowell & Moring LLP

(57) ABSTRACT

To rapidly stop an upperstructure even though relief pressure is lowered due to an abnormality in a hydraulic device included in a swing motor driving circuit while intending to stop the upperstructure when a predetermined delay time has passed since a swing operation tool is brought back to a neutral position, provided are: a first choke for controlling a parking brake to apply a braking force to a swing motor when a predetermined delay time has passed since the tool is brought back to a neutral position in a state where the tool is connected to a pilot pump; and an on-off valve and a second choke for controlling the parking brake to apply a braking force to the motor when a delay time shorter than the predetermined delay time has passed since the tool is brought back to the neutral position and disconnected from the pilot pump.

8 Claims, 2 Drawing Sheets

(56) References Cited

FOREIGN PATENT DOCUMENTS

| JP | 5-15601 Y2 | 4/1993 |
|----|---|---|
| JP | 5-38402 U | 5/1993 |
| JP | 7-71415 A | 3/1995 |
| JP | 7-26442 Y2 | 6/1995 |
| JP | 2001-27202 A | 1/2001 |
| JP | 2010-156395 A | 7/2010 |
| JP | 2010156395 A * | 7/2010 |

OTHER PUBLICATIONS

Chinese Office Action dated Mar. 4, 2015 (eight pages).

* cited by examiner

HYDRAULIC DRIVE OF OPERATING MACHINE

TECHNICAL FIELD

The present invention relates to a hydraulic drive of operating machine, which is provided in the operating machine such as a hydraulic excavator having a upperstructure, and which includes a swing motor for driving the upperstructure and a parking brake for applying a braking force to the swing motor.

BACKGROUND ART

A background-art technique disclosed in Patent Literature 1 is provided as a background-art technique of this type. This background-art technique is provided in a hydraulic excavator having a upperstructure, and includes a hydraulic pump, a swing motor which is operated by pressure oil discharged from the hydraulic pump so as to drive the upperstructure, a parking brake which applies a braking force to the swing motor, a swing direction control valve which controls the flow of the pressure oil supplied from the hydraulic pump to the swing motor, and a swing operation tool which operates to change over the swing direction control valve. In addition, the background-art technique also includes a parking brake control unit including a control portion and a changeover valve for controlling the parking brake so as to apply a braking force to the swing motor when a predetermined delay time has passed since the swing operation tool is brought back to a neutral position from an operation position.

Patent Literature 2 also discloses a similar technique to that in the aforementioned Patent Literature 1. In Patent Literature 2, there are provided a brake release cylinder which applies a braking force to a hydraulic motor, a hydraulic operation valve which controls the flow of pressure oil supplied from a hydraulic pump to the hydraulic motor, and a pilot changeover valve which operates to change over the hydraulic operation valve, and there is also provided a pressure-compensated flow rate control valve including a choke for controlling the brake release cylinder so as to apply a braking force to the hydraulic motor when a predetermined delay time has passed since the pilot changeover valve is brought back to a neutral position from an operation position.

According to these background-art techniques disclosed in Patent Literatures 1 and 2, a braking force is applied to the swing motor or the hydraulic motor by the parking brake or the brake release cylinder when the predetermined delay time has passed since the swing direction control valve or the pilot changeover valve is brought back to the neutral position from the operation position, so that the upperstructure or the like can be braked and stopped while the wear damage of the parking brake or the brake release cylinder is suppressed.

A configuration disclosed in Patent Literature 3 fundamentally has a different technical idea from those in the aforementioned background-art techniques disclosed in Patent Literatures 1 and 2. In the configuration disclosed in Patent Literature 3, a connection/disconnection unit including a gate lever, a gate lever switch and a hydraulic lock valve for connecting/disconnecting a swing operation tool to/from a pilot pump is provided in a hydraulic excavator having a travel base and a upperstructure. As soon as a swing direction control valve and the pilot pump are disconnected by the connection/disconnection unit, a braking force is applied to a swing motor by a brake cylinder immediately in electrical response to the disconnection. In response to the stop of the swing motor, a swing drive for driving the upperstructure is stopped. The background-art technique disclosed in Patent Literature 3 is apt to cause undesired action as follows. That is, the travel base provided under the upperstructure may move due to the inertia of the upperstructure because the upperstructure is stopped without a delay time but immediately after the connection/disconnection unit is operated in the state where the upperstructure is swinging. In addition, due to the operation of stopping the upperstructure as described above, wear damage may occur easily in a parking brake which applies a braking force to the swing motor.

CITATION LIST

Patent Literature

Patent Literature 1: JP-A-63-312432
Patent Literature 2: Japanese Examined Utility Model Application No. 5-15601
Patent Literature 3: JP-A-2010-156395

SUMMARY OF INVENTION

Technical Problem

According to the aforementioned background-art technique disclosed in Patent Literature 1, a braking force is applied to the hydraulic motor by the parking brake when the predetermined delay time has passed since the swing operation tool is operated to be brought back to the neutral position from the operation position, so that the wear damage of the parking brake as shown in Patent Literature 3 can be suppressed. However, when there occurs an abnormality in a hydraulic device of a swing motor driving circuit for applying a braking force to the swing motor, the relief pressure for braking the swing motor may be reduced. When the relief pressure is reduced thus, the swing speed cannot be reduced satisfactorily even if a braking force is applied to the swing motor by the parking brake. Therefore, it may take time to stop the upperstructure. The same problem may also arise in the background-art technique disclosed in Patent Literature 2.

The present invention has been accomplished in consideration of the aforementioned actual situation in the background art. An object of the invention is to provide a hydraulic drive of operating machine, in which a upperstructure can be stopped rapidly even though a relief pressure is lowered due to an abnormality in a hydraulic device included in a swing motor driving circuit while it is intended to stop the upperstructure when a predetermined delay time has passed since a swing operation tool is brought back to a neutral position from an operation position.

Solution to Problem

In order to achieve the object, the invention provides a hydraulic drive of operating machine, which is provided in the operating machine having a upperstructure and a work device attached to the upperstructure, the hydraulic drive including: a hydraulic pump, a swing motor which is operated by pressure oil discharged from the hydraulic pump so as to drive the upperstructure, a parking brake which applies a braking force to the swing motor, a swing direction control valve which controls a flow of the pressure oil supplied from the hydraulic pump to the swing motor, a swing operation tool which operates to change over the swing direction control valve, a pilot pump which supplies a pilot pressure to the swing operation tool, and a connection/disconnection unit which connects/disconnects the swing operation tool to/from the pilot pump; the hydraulic drive further including: a parking brake control unit which controls the parking brake so as to apply the braking force to the swing motor when a predetermined delay time has passed since the swing operation tool is brought back to a neutral position from an operation position; the hydraulic drive being characterized in that: the parking brake control unit includes: a first parking brake control unit which controls the parking brake so as to apply the braking force to the swing motor when the predetermined delay time has passed since the swing operation tool is brought back to the neutral position from the operation position in a state where the swing operation tool is connected to the pilot pump by the connection/disconnection unit; and a second parking brake control unit which operates in conjunction with the connection/disconnection unit to control the parking brake so as to apply the braking force to the swing motor when a shorter delay time than the predetermined delay time has passed since the connection/disconnection unit operates to disconnect the swing operation tool from the pilot pump.

According to the invention configured thus, when the swing operation tool is brought back to the neutral position from the operation position in the state where the swing operation tool is connected to the pilot pump by the connection/disconnection unit, a braking force of the parking brake is applied to the swing motor under the control of the first parking brake control unit after the passage of the predetermined delay time. Thus, the swing motor is stopped so that the upperstructure can be stopped. This function is equivalent to that in the aforementioned background-art techniques disclosed in Patent Literatures 1 and 2, except that the invention is relevant to the operation of the connection/disconnection unit.

In addition, according to the invention, when the connection/disconnection unit is operated in an emergency or the like so as to disconnect the swing operation tool from the pilot pump, the braking force of the parking brake is applied to the swing motor by the second parking brake control unit after the passage of a shorter delay time than the predetermined delay time used when the braking force is applied by the first parking brake control unit. Thus, the swing motor is stopped so that the upperstructure can be stopped.

That is, according to the invention, the upperstructure can be stopped rapidly by the second parking brake control unit even though a relief pressure is lowered due to an abnormality in a hydraulic device included in a swing motor driving circuit while it is intended to stop the upperstructure when the predetermined delay time has passed since the swing operation tool is brought back to the neutral position from the operation position.

In addition, according to the invention, the aforementioned configuration of the invention may be characterized in that: the second parking brake control unit operating in conjunction with the connection/disconnection unit cooperates with the first parking braking control unit to apply the braking force to the swing motor when the shorter delay time than the predetermined delay time has passed since the swing operation tool is brought back to the neutral position from the operation position and the connection/disconnection unit operates to disconnect the swing operation tool from the pilot pump.

According to the invention configured thus, the connection/disconnection unit is operated to disconnect the swing operation tool from the pilot pump immediately when the swing speed of the upperstructure cannot be reduced satisfactorily due to an abnormality in a hydraulic device included in a swing motor driving circuit in spite of the braking force of the parking brake applied to the swing motor under the control of the first parking brake control unit. On this occasion, the second parking brake control unit operating in conjunction with the connection/disconnection unit cooperates with the aforementioned first parking brake control unit, so as to apply the braking force of the parking brake to the swing motor after the passage of a shorter delay time than the predetermined delay time used when the braking force is applied by the first parking brake control unit. Thus, the swing motor is stopped so that the upperstructure can be stopped.

In addition, according to the invention, the aforementioned configuration of the invention may be characterized in that: the first parking brake control unit includes a pipe line which connects the parking brake with a hydraulic oil tank, and a first choke which is provided in the pipe line; and the second parking brake control unit includes: a branch pipe line which branches from the pipe line connecting the parking brake with the hydraulic oil tank, and which can bring return oil from the parking brake back to the hydraulic oil tank; an on-off valve which is provided in the branch pipe line and which has a closed position to which the on-off valve is changed over by a pilot pressure of the pilot pump so as to close the branch pipe line when the connection/disconnection unit operates to connect the swing operation tool to the pilot pump, and an open position to which the on-off valve is changed over by a spring force so as to open the branch pipe line when the connection/disconnection unit operates to disconnect the swing operation tool from the pilot pump; and a second choke which narrows the oil brought back to the hydraulic oil tank through the branch pipe line when the on-off valve is kept in the open position.

In addition, according to the invention, the aforementioned configuration of the invention may be characterized in that: the on-off valve and the second choke are formed separately from each other, and provided in the branch pipe line individually.

In addition, according to the invention, the aforementioned configuration of the invention may be characterized in that: the second choke is provided in the on-off valve.

Advantageous Effects of Invention

According to the invention, it is possible to rapidly stop a upperstructure by means of a second parking brake control unit even though a relief pressure is lowered due to an abnormality in a hydraulic device included in a swing motor driving circuit while it is intended to stop the upperstructure when a predetermined delay time has passed since a swing operation tool is brought back to a neutral position from an operation position. Thus, it is possible to implement operating machine which is more excellent in a function of braking the upperstructure and higher in safety than in the background art.

DESCRIPTION OF EMBODIMENT

Figure 1:
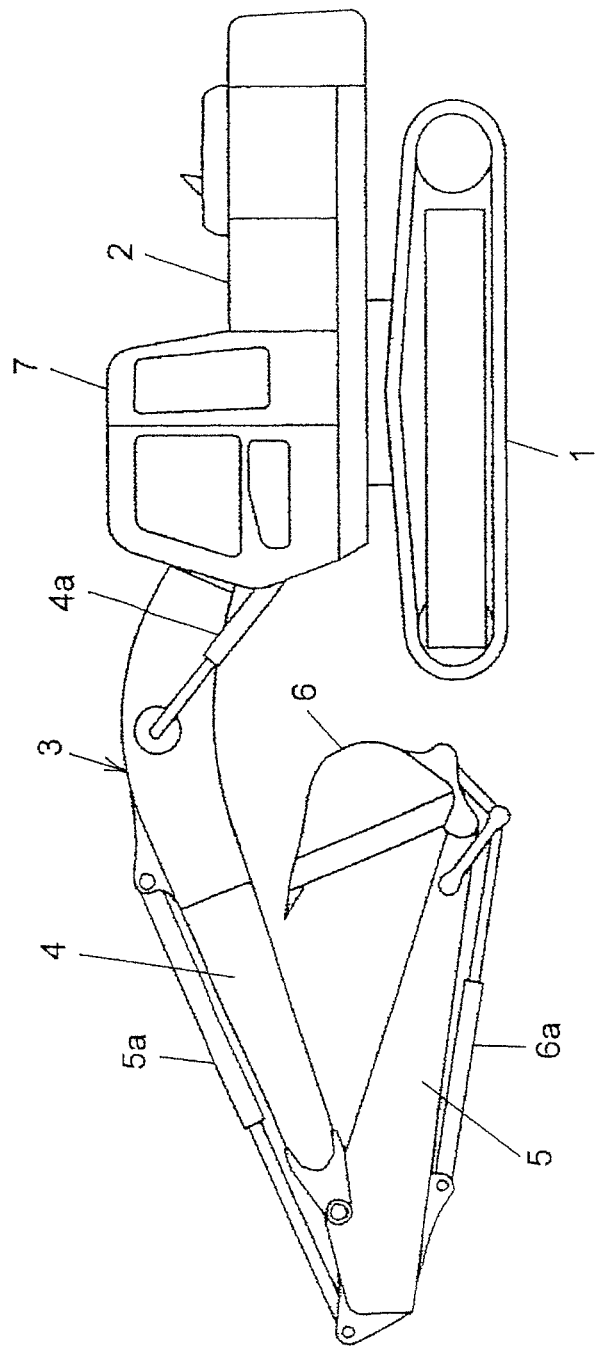
FIG. 1 A side view showing a hydraulic excavator as an example of operating machine provided with an embodiment of a hydraulic drive according to the invention.

An embodiment of a hydraulic drive of operating machine according to the invention will be described below with reference to the drawings.

The operating machine provided with the hydraulic drive according to the embodiment is, for example, a hydraulic excavator. The hydraulic excavator has a travel base 1, a upperstructure 2 provided on the travel base 1, and a work device 3 attached to the upperstructure 2. The work device 3 includes a boom 4 which is connected to the upperstructure 2 so as to be rotatable in an up/down direction, an arm 5 which is connected to a front end of the boom 4 so as to be rotatable in the up/down direction, a bucket 6 which is connected to a front end of the arm 5 so as to be rotatable in the up/down direction, a boom cylinder 4a which drives the boom 4, an arm cylinder 5a which drives the arm. 5, and a bucket cylinder 6a which drives the bucket 6. An operator's cab 7 is disposed on the upperstructure 2.

Figure 2:
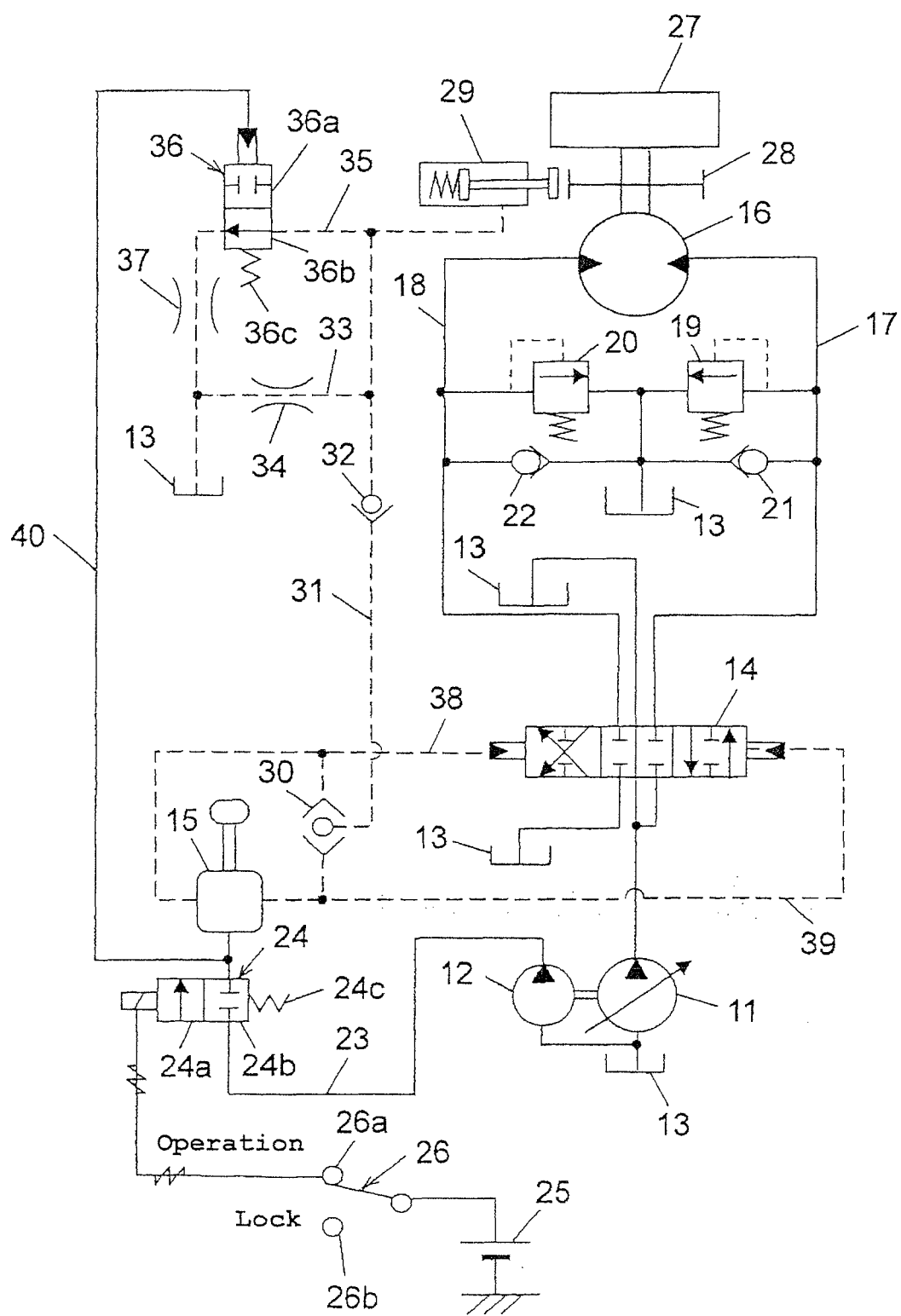
FIG. 2 A circuit diagram showing the hydraulic drive according to the embodiment.

The hydraulic drive according to the embodiment provided in the hydraulic excavator has a hydraulic pump 11, a pilot pump 12 and a hydraulic oil tank 13, as shown in FIG. 2. In addition, in the embodiment, the hydraulic drive has a swing drive 27 which drives the upperstructure 2, a swing motor 16 which drives the swing drive 27, a swing direction control valve 14 which controls a flow of pressure oil supplied from the hydraulic pump 11 to the swing motor 16 through a first main pipe line 17 or a second main pipe line 18, and a swing operation tool 15 which operates to change over the swing direction control valve 14. In addition, in the embodiment, the hydraulic drive has relief valves 19 and 20 which define a relief pressure of the swing motor 16, and check valves 21 and 22 which can supply oil for preventing occurrence of negative pressure in the first main pipe line 17 and the second main pipe line 18.

A swing motor driving circuit is constituted by the aforementioned hydraulic pump 11, the swing motor 16, the first main pipe line 17, the second main pipe line 18, the swing direction control valve 14, the swing operation tool 15, the relief valves 19 and 20, the check valves 21 and 22, and the hydraulic oil tank 13.

In addition, in this embodiment, there are provided a brake body 28 which is disposed on an output shaft of the swing motor 16, a parking brake 29 which applies a braking force to the swing motor 16 through the brake body 28, and a shuttle valve 30 which is connected to the parking brake 29 through a pipe line 31. Of pilot pressures supplied to pilot pipe lines 38 and 39 which connect two control portions of the swing operation tool 15 and the swing direction control valve 14 with each other, a higher pilot pressure is extracted by the shuttle valve 30. The pipe line 31 is provided with a check valve 32 which allows the pilot pressure to be supplied from the shuttle valve 30 to the parking brake 29, and prevents the pilot pressure from flowing in a reverse direction. When the pilot pressure extracted from the shuttle valve 30 is supplied to the parking brake 29, an operating portion of the parking brake 29 leaves the brake body 28 to come into a state where the parking brake 29 applies no braking force to the swing motor 16, that is, a brake release state. On the contrary, when the supply of the pilot pressure to the parking brake 29 is stopped, the operating portion of the parking brake 29 abuts against the brake body 28 to come into a state where the parking brake 29 applies a braking force to the swing motor 16, that is, a brake state.

In addition, in this embodiment, there is provided a connection/disconnection unit which connects/disconnects the swing operation tool 15 to/from the pilot pump.

In addition, in this embodiment, there is provided a parking brake control unit which controls the parking brake 29 so as to apply a braking force to the swing motor 16 when a predetermined delay time has passed since the swing operation tool 15 is brought back to a neutral position from an operation position. This parking brake control unit is constituted by a first parking brake control unit and a second parking brake control unit.

The first parking brake control unit controls the parking brake 29 so as to apply a braking force to the swing motor 16 when a predetermined delay time T has passed since the swing operation tool 15 is brought back to the neutral position from the operation position in the state where the swing operation tool 15 is connected to the pilot pump 12 by the aforementioned connection/disconnection unit.

The second parking brake control unit operating in conjunction with the connection/disconnection unit cooperates with the first parking brake control unit to control the parking brake 29 so as to apply a braking force to the swing motor 16 when a shorter delay time t than the predetermined delay time T has passed since the swing operation tool 15 is brought back to the neutral position from the operation position and the aforementioned connection/disconnection unit operates to disconnect the swing operation tool 15 from the pilot pump 12.

The aforementioned connection/disconnection unit is, for example, provided on a side of a driver's seat placed in the operator's cab 7. The connection/disconnection unit includes a not-shown gate lock lever which is operated in either an operation position for keeping it possible to drive the upperstructure 2 and the work device 3 or a lock position for keeping it impossible to drive the upperstructure 2 and the work device 3. In addition, the connection/disconnection unit includes a switch 26 which is connected to a power supply 25 so as to be switched in accordance with the operation of the gate lock lever. Further, the connection/disconnection unit includes an electromagnetic valve 24 which is provided in a pipe line 23 connecting the pilot pump 12 with the swing operation tool 15.

The electromagnetic valve 24 has an open position 24a to which the electromagnetic valve 24 is changed over in accordance with a signal outputted through the switch 26 so as to connect the swing operation tool 15 with the pilot pump 12 as soon as the gate lock lever is operated in the operation position to switch the switch 26 to a contact 26a side. In addition, the electromagnetic valve 24 has a closed position 24b to which the electromagnetic valve 24 is changed over by the force of a spring 24c so as to disconnect the swing operation tool 15 from the pilot pump 12 as soon as the gate lock lever is operated in the lock position to switch the switch 26 to a contact 26b side.

Though not shown in FIG. 2 for the sake of simplification of description, the hydraulic drive provided in this embodiment is provided with various operation tools such as a boom operation tool, an arm operation tool, etc. in addition to the swing operation tool 15. These various operation tools including the swing operation tool 15 are connected to the pilot pump 12 through the same pipe line 23. Accordingly, when the electromagnetic valve 24 is changed over to the open position 24a, the various operation tools including the swing operation tool 15 are connected to the pilot pump 12 so that corresponding operations can be performed. When the electromagnetic valve 24 is changed over to the closed position 24b, the various operation tools including the swing operation tool 15 are disconnected from the pilot pump 12 so that the corresponding operations cannot be performed.

The aforementioned first parking brake control unit includes a pipe line 33 one end of which is connected to a portion of the pipe line 31 located between the check valve 32 and the parking brake 29 and which connects the parking brake 29 with the hydraulic oil tank 13, and a first choke 34 which is provided in the pipe line 33.

The aforementioned second parking brake control unit includes a branch pipe line 35 one end of which is connected to a portion of the pipe line 31 located between the parking brake 29 and a connection point of the pipe line 31 and the pipe line 33 and which branches from the portion of the pipe line 31 located on the parking brake 29 side with respect to the check valve 32 connecting the parking brake 29 with the hydraulic oil tank 13, so that return oil from the parking brake 29 can be brought back to the hydraulic oil tank 13. In addition, the second parking brake control unit includes an on-off valve 36 having a closed position 36a and an open position 36b. When the electromagnetic valve 24 connecting the swing operation tool 15 with the pilot pump 12 is changed over to the open position 24a, the on-off valve 36 is changed over to the closed position 36a by the pilot pressure of the pilot pump 12 so as to close the branch pipe line 35. When the electromagnetic valve 24 is changed over to the closed position 24b to disconnect the swing operation tool 15 from the pilot pump 12, the on-off valve 36 is changed over to the open position 36b by the force of a spring 36c so as to open the branch pipe line 35. Further, the second parking control unit includes a second choke 37 which is, for example, formed separately from the on-off valve 36 and provided in a portion of the branch pipe line 35 located between the on-off valve 36 and the hydraulic oil tank 13.

Although the on-off valve 36 and the second choke 37 are formed separately from each other and provided in the branch pipe line 35 individually in this embodiment, the second choke 37 may be designed to be provided in the open position 36b of the on-off valve 36.

When the no-shown gate lock lever is operated into an operation state in the embodiment configured thus, the switch 26 is switched to the contact 26a side to bring the electromagnetic valve 24 into the open position 24a so that the swing operation tool 15 can be connected to the pilot pump 12 through the open position 24a of the electromagnetic valve 24, as described above. Thus, a swing operation can be performed. In addition, the pilot pressure of the pilot pump 12 is applied to a control portion of the on-off valve 36 through a pipe line 40, so as to change over the on-off valve 36 to the closed position 36a against the force of the spring 36c. Thus, the branch pipe line 35 is closed.

When the swing operation tool 15 is operated in this state, the pilot pressure generated due to the operation is applied to the parking brake 29 through the shuttle valve 30, the pipe line 31 and the check valve 32 so as to bring the parking brake 29 into a brake release state. In addition, the swing direction control valve 14 is changed over by the pilot pressure supplied from the swing operation tool 15 so that the pressure oil discharged from the hydraulic pump 11 is supplied to the swing motor 16 through the first main pipe line 17 or the second main pipe line 18 so as to actuate the swing motor 16. Thus, the swing drive 27 is driven to swing the upperstructure 2. For example, the work device 3 is driven with the swing of the upperstructure 2 so that work such as swing to release excavated soils can be performed.

On the other hand, when the swing operation tool 15 is brought back to the neutral position in order to stop the upperstructure 2 in the state where the upperstructure 2 is being swung as described above, the swing direction control valve 14 returns to neutral, and the supply of the pilot pressure from the shuttle valve 30 to the parking brake 29 is stopped. On this occasion, the supply of the pressure oil to the swing motor 16 is stopped due to the return of the swing direction control valve 14 to the neutral position. Thus, the swing motor 16 is stopped soon. In addition, the residual pressure of the pipe line 31 is let out to the hydraulic oil tank 13 gradually through the first choke 34 provided in the pipe line 33 connected to the parking brake 29. That is, due to the first choke 34, a braking force is applied to the swing motor 16 through the brake body 28 by the parking brake 29 when the predetermined delay time T has passed since the swing operation tool 15 is brought back to the neutral position. Thus, a brake state is set so that the stop state of the upperstructure 2 can be kept stably.

In addition, when an operator sitting on the driver's seat operates on the not-shown gate lock lever in order to get off the vehicle in the brake state in which the upperstructure 2 is thus stopped and a braking force is applied to the swing motor 16 by the parking brake 29, the switch 26 is switched to the contact 26b side. Thus, the power supply to the electromagnetic valve 24 is stopped, and the electromagnetic valve 24 is changed over to the closed position 24b by the force of the spring 24c. Therefore, as described above, the swing operation tool 15 is disconnected from the pilot pump 12 so that the swing motor 16 and hydraulic cylinders such as the boom cylinder 4a included in the work device 3 cannot be operated. That is, for example, even when the various operation tools including the swing operation tool 15 are operated by mistake, the upperstructure 2 and the work device 3 are prevented from being driven, so that safety can be kept. In addition, on this occasion, the on-off valve 36 is changed over to the open position 36b as the electromagnetic valve 24 is changed over to the closed position 24b. Thus, the parking brake 29 is connected to the hydraulic oil tank 13 also through the on-off valve 36 and the second choke 37.

In this embodiment, for example, when the upperstructure 2 which is being swung is to be stopped rapidly because there occurs such a situation that the relief pressure is lowered due to an abnormality of a hydraulic device included in a swing motor driving circuit so that the swing speed of the upperstructure 2 cannot be reduced satisfactorily, it will go well if the swing operation tool 15 is brought back to the neutral position from the operation position and the gate lock lever is operated into a lock position immediately. As a result, the electromagnetic valve 24 is changed over to the closed position 24b so that the on-off valve 36 can be changed over to the open position 36b, as described above. Thus, the parking brake 29 is connected to the hydraulic oil tank 13 through the first choke 34 and also connected to the hydraulic oil tank 13 through the open position 36b of the on-off valve 36 and the second choke 37. Due to the cooperation of these, the braking force of the parking brake 29 is applied to the swing motor 16 through the brake body 28 when the shorter delay time t than the predetermined delay time T has passed. In this manner, the upperstructure 2 can be stopped rapidly if occasion demands.

According to the embodiment configured thus, in order to stop the upperstructure 2 when the predetermined delay time T has passed since the swing operation tool 15 is brought back to the neutral position from the operation position, the not-shown gate lock lever is operated into the lock position to change over the electromagnetic valve 24 to the closed position 24b to thereby disconnect the swing direction control valve 15 from the pilot pump 12. Thus, even though the relief pressure is lowered due to an abnormality in the swing motor driving circuit, the upperstructure 2 can be stopped rapidly by the cooperation of the first choke 34 with the on-off valve 36 and the second choke 37. It is therefore possible to implement a hydraulic excavator superior in braking function of the upperstructure 2 and high in safety.

In the aforementioned embodiment, configuration may be made so that the relation between an opening area of the first choke 34 and an opening area of the second choke 37 is set in advance to make the opening area of the second choke 37 larger than the opening area of the first choke 34. With this configuration, when the electromagnetic valve 24 is changed over to the closed position 24b in spite of the operation state of the swing operation tool 15, the parking brake 29 can be actuated in a shorter delay time than the operation delay time of the parking brake 29 using the first choke 34. That is, in an emergency, the parking brake 29 can be actuated in a shorter delay time than the normal delay time in spite of the operation state of the swing operation tool 15. In addition, when the opening area of the second choke 27 is adjusted, easy adjustment can be made to shorten the operation delay time of the parking brake 29 at the time of operation of the gate lock lever without changing the operation delay time of the parking brake 29 using the swing operation tool 15.

REFERENCE SIGNS LIST

2 upperstructure
3 work device
11 hydraulic pump
12 pilot pump
13 hydraulic oil tank
14 swing direction control valve
15 swing operation tool
16 swing motor
23 pipe line
24 electromagnetic valve
24a open position
24b closed position
24c spring
26 switch
26a contact
26b contact
27 swing drive
28 brake body
29 parking brake
30 shuttle valve
31 pipe line
33 pipe line
34 first choke (first parking brake control unit
35 branch pipe line
36 on-off valve (second parking brake control unit)
36a closed position
36b open position
36c spring
37 second choke (second parking brake control unit)
38 pilot pipe line
39 pilot pipe line
40 pipe line

The invention claimed is:

1. A hydraulic drive of operating machine, which is provided in the operating machine having a upperstructure and a work device attached to the upperstructure, the hydraulic drive comprising:
a hydraulic pump, a swing motor which is operated by pressure oil discharged from the hydraulic pump so as to drive the upperstructure, a parking brake which applies a braking force to the swing motor, a swing direction control valve which controls a flow of the pressure oil supplied from the hydraulic pump to the swing motor, a swing operation tool which operates to change over the swing direction control valve, a pilot pump which supplies a pilot pressure to the swing operation tool, and a connection/disconnection unit which connects/disconnects the swing operation tool to/from the pilot pump; the hydraulic drive further comprising:
a parking brake control unit which controls the parking brake so as to apply the braking force to the swing motor when a predetermined delay time has passed since the swing operation tool is brought back to a neutral position from an operation position; the hydraulic drive, wherein:
the parking brake control unit includes:
a first parking brake control unit which controls the parking brake so as to apply the braking force to the swing motor when the predetermined delay time has passed since the swing operation tool is brought back to the neutral position from the operation position in a state where the swing operation tool is connected to the pilot pump by the connection/disconnection unit; and
a second parking brake control unit which is provided separately from the first parking brake control unit and which operates in conjunction with the connection/disconnection unit to control the parking brake so as to apply the braking force to the swing motor when a shorter delay time than the predetermined delay time has passed since the connection/disconnection unit operates to disconnect the swing operation tool from the pilot pump.

2. A hydraulic drive of operating machine according to claim 1, wherein:
the second parking brake control unit operating in conjunction with the connection/disconnection unit cooperates with the first parking brake control unit to apply the braking force to the swing motor when the shorter delay time than the predetermined delay time has passed since the swing operation tool is brought back to the neutral position from the operation position and the connection/disconnection unit operates to disconnect the swing operation tool from the pilot pump.

3. A hydraulic drive of operating machine according to claim 2, wherein:
the first parking brake control unit includes a pipe line which connects the parking brake with a hydraulic oil tank, and a first choke which is provided in the pipe line; and
the second parking brake control unit includes:
a branch pipe line which branches from the pipe line connecting the parking brake with the hydraulic oil tank, and which can bring return oil from the parking brake back to the hydraulic oil tank;
an on-off valve which is provided in the branch pipe line and which has a closed position to which the on-off valve is changed over by a pilot pressure of the pilot pump so as to close the branch pipe line when the connection/disconnection unit operates to connect the swing operation tool to the pilot pump, and an open position to which the on-off valve is changed over by a spring force so as to open the branch pipe line when the connection/disconnection unit operates to disconnect the swing operation tool from the pilot pump; and
a second choke which narrows the oil brought back to the hydraulic oil tank through the branch pipe line when the on-off valve is kept in the open position.

4. A hydraulic drive of operating machine according to claim 3, wherein:
the on-off valve and the second choke are formed separately from each other, and provided in the branch pipe line individually.

5. A hydraulic drive of operating machine according to claim 3, wherein:
the second choke is provided in the on-off valve.

6. A hydraulic drive of operating machine according to claim 1, wherein:
the first parking brake control unit includes a pipe line which connects the parking brake with a hydraulic oil tank, and a first choke which is provided in the pipe line; and
the second parking brake control unit includes:
a branch pipe line which branches from the pipe line connecting the parking brake with the hydraulic oil tank, and which can bring return oil from the parking brake back to the hydraulic oil tank;
an on-off valve which is provided in the branch pipe line and which has a closed position to which the on-off valve is changed over by a pilot pressure of the pilot pump so as to close the branch pipe line when the connection/disconnection unit operates to connect the swing operation tool to the pilot pump, and an open position to which the on-off valve is changed over by a spring force so as to open the branch pipe line when the connection/disconnection unit operates to disconnect the swing operation tool from the pilot pump; and
a second choke which narrows the oil brought back to the hydraulic oil tank through the branch pipe line when the on-off valve is kept in the open position.

7. A hydraulic drive of operating machine according to claim 6, wherein:
the on-off valve and the second choke are formed separately from each other, and provided in the branch pipe line individually.

8. A hydraulic drive of operating machine according to claim 6, wherein:
the second choke is provided in the on-off valve.

* * * * *